United States Patent Office 3,391,539
Patented July 9, 1968

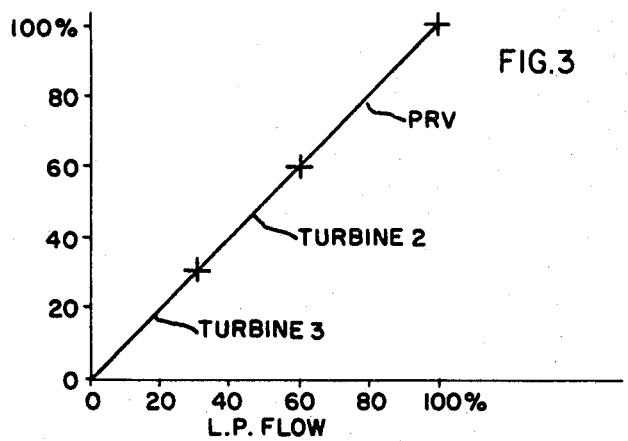
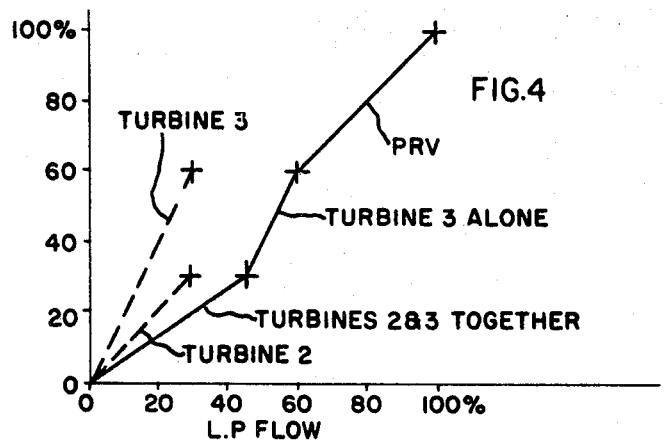
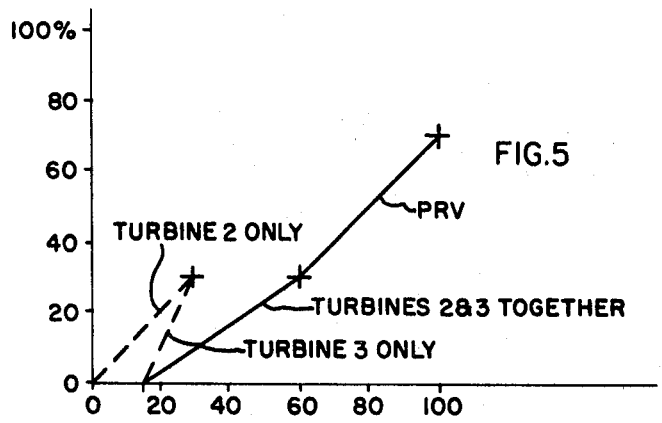

3,391,539
PRESSURE CONTROL AND FLOW DISPATCHING SYSTEM FOR STEAM TURBINE POWERPLANT
Vladimir T. Dimitroff, Jr., Peabody, and James B. Wagner, Lynnfield, Mass., assignors to General Electric Company, a corporation of New York
Filed Aug. 16, 1967, Ser. No. 661,009
8 Claims. (Cl. 60—67)

ABSTRACT OF THE DISCLOSURE

In a steam powerplant having a plurality of process steam sources such as extraction turbines, noncondensing turbines, and reducing valves, a pressure regulating system for allocating and dispatching flow of such process steam in a pre-established order of preference.

Background of the invention

Figure 1:
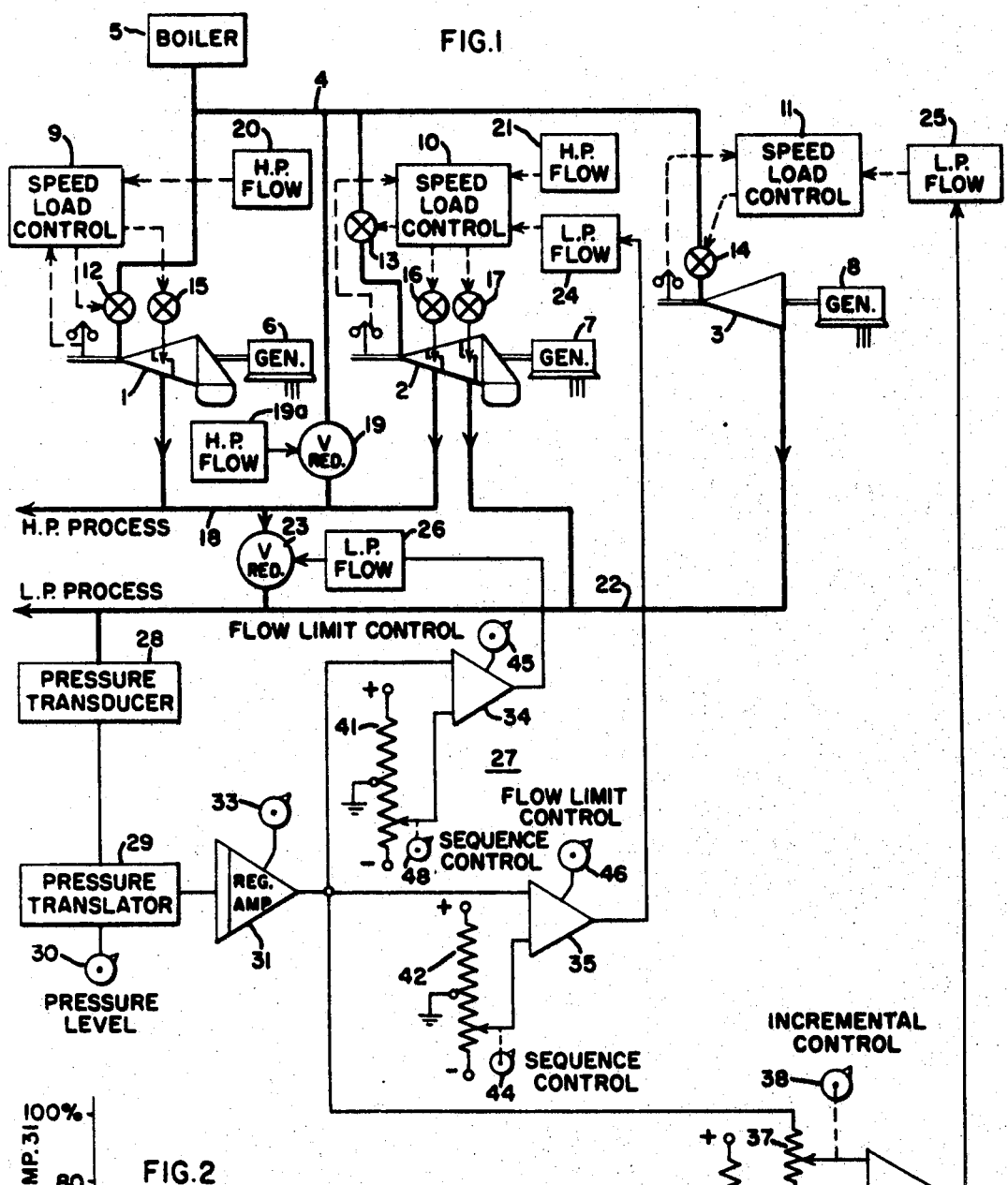

This invention relates generally to a control system for a steam turbine powerplant having turbines driving loads and in addition supplying process steam at one or more pressure levels. More particularly, the invention relates to allocation, sequencing, and source selection for the process steam from the various turbines or from pressure reducing valves between the various steam pressure levels, along with means to regulate the pressure of the process.

System designs often call for various type of steam turbines in a conglomerate arrangement which are arranged to drive loads and in addition to supply process steam at more than one pressure level. Often such powerplants grow with the industrial complex which they serve, and turbines of newer types with more complex control systems are added which are not exactly compatible with the previous turbines serving the powerplant. Also, new processes may be added to the plant which require process steam at different pressure levels from those originally planned. System studies will indicate that it is desirable to take the process steam from one type of steam source before beginning to utilize the second, more inefficient source and to provide also for various other flexibilities of operation.

Central control systems for a group of older and newer extraction turbines have been suggested. U.S. Patent 3,233,412, issued to J. B. Wagner on Feb. 8, 1966, describes a master-slave system, wherein a number of older extraction turbines with mechanical controls are slaved to a master turbine with newer electrohydraulic controls. In that patent, flow of process steam from the extraction turbines is shared in parallel, and maintained in accordance with selected fractions of flow from the various turbines. In that system, there was no means of obtaining additional process steam when the extraction units reached their flow capabilities. It has been suggested in the past to obtain additional flow from the pressure reducing station which throttles and desuperheats steam from a high pressure steam line to a low pressure steam line, but this is a very inefficient use of the steam. Accordingly, it is desirable to obtain a flow sequence, giving preference to flow from the most efficient process steam source, followed by the next most efficient source, etc.

Accordingly, one object of the present invention is to provide an improved control system for obtaining sequential operation from the various process steam sources in a steam turbine powerplant complex including various types of turbines and pressure reducing valves.

Another object of the invention is to provide an improved pressure regulating system for holding process steam at a selected value and allocating the share and sequence of steam flow to selected sources.

The subject matter which is regarded as the invention is particularly pointed out and distinctly claimed in the concluding portion of the specification. The invention, however, both as to organization and method of practice, together with further objects and advantages thereof, may best be understood by reference to the following description, taken in connection with the accompanying drawing in which:

FIG. 1 is a simplified schematic diagram of an industrial steam turbine powerplant having a centralized pressure control for process steam.

Summary of the invention

Briefly stated, the invention comprises a plurality of steam flow controllers operated by a command pressure regulating control. The separate flow controllers have means to independently obtain dispatching and sequential operation of the process steam sources as well as including means to set the incremental and base flow for the process.

Description of the preferred embodiment

Referring now to FIG. 1 of the drawing, an industrial powerplant is depicted in schematic form. The layout is merely intended to be typical of such a powerplant and is in no way intended to be limiting upon the invention to be described.

A single extraction turbine 1, a double automatic extraction turbine 2, both of the condensing type, and a noncondensing turbine 3 are all supplied with steam from a common supply conduit 4 serviced by one or more boilers 5. The turbines 1–3 are connected to loads such as generators 6–8 respectively. The generators may be arranged to be coupled together electrically to operate as a single power source by circuit breakers and tielines not material to the present invention. When they are, the turbines 1, 2, 3 are all forced to run at the same frequency and share the common electrical load.

Turbines 1–3 are controlled as to speed or load by control units 9–11 respectively which may be either of the mechanical governor type or the electrohydraulic type as shown in the aforementioned Wagner patent. In the case of the extraction units 1, 2, the speed/load control units 9, 10 obtain an integrated control of extraction pressures as well as loads by coordinated positioning of steam inlet valves 12, 13 and the extraction valves 15, 16, 17. Systems for accomplishing the foregoing coordinated valve control are well known in the art. They may, for example, be of the mechanical type using a three-arm linkage or of the electrohydraulic type using cross modified electrical signals, as described in U.S. Patents 2,977,768 and 3,064,-435, both issued to J. B. Wagner and K. O. Straney, and assigned to the present assignee. Control unit 11 for the noncondensing turbine 3 may be of the simple mechanical speed governor type which is also well known.

Steam extraction lines from turbines 1 and 2 are both connected to supply a high pressure process supply conduit 18 desired to be held at a selectable value which is lower than supply pressure. Additionally, a pressure reducing valve 19 is connected directly between the steam supply conduit 4 and the high pressure conduit 18 to act as an additional source when the extraction flow capacity of turbines 1 and 2 has been exceeded.

Valve positioning devices are indicated at 20, 21 for the respective inlet extraction valves 15, 16, and at 19a, for the pressure reducing valve 19. If the extraction turbines 1, 2 were operating alone, pressure sensing devices would control valve positions via the control units 9, 10. Here, however, the normal extraction pressure controls are overridden by signals from the valve positioning devices 20,

21. These may be a combination of electrical and pneumatic devices connected to provide an overriding or direct input to position the extraction valves 15–17 when operating on central pressure control in response to a DC signal representing a desired valve position. The valve positioning device 19a for the pressure reducing valve 19 is similar. The valve positioning devices 19a, 20, 21, respond to incoming DC electrical signals indicating a readjustment in the relative valve positions so as to change the flow to the high pressure process line 18. In the case of the turbines 1 and 2, this is done by overriding the normal control units 9 and 10 without disturbing the load balance between the turbines.

In a similar manner, the low pressure extraction conduit from turbine 2 and the exhaust conduit from noncondensing turbine 3 are both connected to a low pressure process line 22. To supply a deficiency of steam, a pressure reducing valve 23 is connected directly between the high pressure process line 18 and the line 22.

A valve positioning device 24 for controlling flow from the low pressure extraction valve 17 is indicated symbolically as before. This is arranged to override the normal LP extraction control in unit 10.

A valve positioning device 25 is shown similarly for the inlet valve 14 of the noncondensing turbine 3. This may simply position a hydraulic pilot valve in series with the normal speed governor pilot valve, the latter being set at high speed to provide overspeed control. A valve positioning device 26 actuates pressure reducing valve 23, as before.

In order to simplify the explanation, the pressure regulating system for the high pressure process line has not been shown on the drawing, since it is very similar to the pressure regulating system for the low pressure conduit to be described and shown generally as 27.

The steam pressure in the low pressure process line 22 is sensed by a transducer 28 which produces an AC signal voltage proportional to steam pressure. Pressure translator 29 compares this input AC signal with an AC signal representing a selected pressure level set with knob 30 and produces an output DC error voltage proportional to the AC pressure error voltage. The aforementioned pressure transducer and pressure translator may be as described in the aforementioned Wagner Patent 3,233,412.

The DC error voltage is applied to a regulation amplifier 31 which has a pressure regulation adjustment for changing the proportional regulation as well as providing a partial-to-full reset action according to the setting of regulation control knob 33. The regulation amplifier may be as described in the copending application Ser. No. 388,887, filed in the name of J. B. Wagner on Aug. 11, 1964, and now Patent No. 3,342,195. The signal supplied by regulation amplifier 31 is a DC command signal calling for new valve positions at the various steam sources to satisfy the flow necessary to hold the LP process pressure at the selected value and with the proper response to process changes.

The command signal from regulation amplifier 31 is supplied to three flow-controlling operational amplifiers 34, 35, 36, the outputs of which are connected respectively to the pressure reducing valve positioning unit 26, the low pressure extraction valve positioning unit 24 for turbine 2 and the inlet valve positioning unit 25 for turbine 3. The signal polarity convention from regulation amplifier 31 is such that a positive-going signal actuates the valves in such a manner as to increase the flow of steam to LP process line 22 and thereby tend to raise the pressure, assuming that the process flow requirements are constant.

The DC command signal from regulation amplifier 31 is supplied to all three flow-controlling operational amplifiers. First, it is applied as one input to flow controller 36 via a gain-adjusting potentiometer 37 controlled by incremental flow adjustment knob 38. A second input to flow controller 36 is from a positively sourced voltage divider 39 for supplying a controllable positive bias voltage, as selected by base flow control knob 40.

The DC command signal is also applied directly as one input to flow controlling operational amplifiers 34, 35. The second input to each of the amplifiers is a selectable bias voltage. This is obtained from suitable voltage sources of both positive and negative polarity connected to either end of center-grounded potentiometers 41, 42 respectively. Normally these are set as shown to supply a negative bias voltage as selected by the sequence control knobs 43, 44 respectively.

Flow controllers 34, 35 may also have flow limit controls 45, 46 respectively to limit the output voltage therefrom.

*Operation of the invention*

The operation of the invention can best be described by reference to the graphs appearing as FIGURES 2 through 6. On these graphs the LP process steam flow at the selected operating pressure, is plotted on the horizontal scale in terms of percent of total flow capability of the system at that pressure. The vertical scale shows total DC output volts as a percent of full scale output from the regulation amplifier 31, i.e. the DC command signal.

Figure 2:
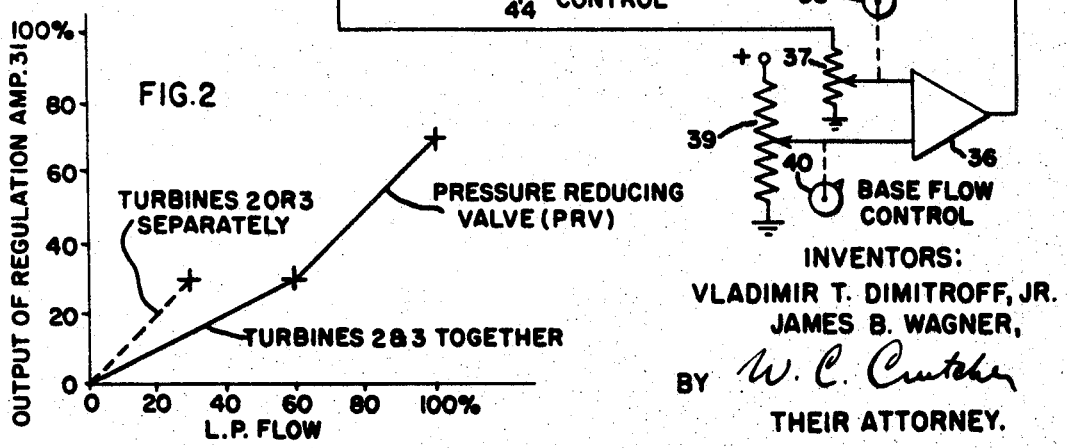

The solid line in FIG. 2 illustrates the combined flow-producing effects of turbines 2 and 3 and the pressure reducing station 23 at any given command signal. For purposes of explanation, the dotted line shows characteristics of the individual turbines 2 and 3 with respect to LP flow for a given command signal, which are assumed identical in the system shown. For each of the FIGS. 2–5, the controls 38, 40, 43, 44 are set in a different manner. The settings shown on the drawing in FIG. 1 happen to apply to FIG. 5. FIG. 2 operation is obtained by setting the incremental flow control 38 on flow controller 36 so that the full or unattenuated command signal is received by turbine 3 (top position on potentiometer 37). The base flow control knob 40 is set to the grounded position so that no bias is applied to controller 36. For flow controller 35, sequence control 44 is set to the center or grounded position so that no bias voltage is applied to the flow controller. For flow controller 34, however, sequence control 43 is set to apply a negative bias signal.

The command signal from amplifier 31 is supplied equally to flow controllers 35, 36. Turbines 2 and 3 will share the flow equally to their limit at 60% of total flow. At this point, the command signal reaches a voltage which exceeds the negative bias voltage applied by sequence control 43 to amplifier 34. An output signal is therefore generated from flow controller 34 and the remainder of the flow is supplied by pressure reducing station 23.

FIG. 3 illustrates operation when turbines 2 and 3 as well as the pressure reducing valve 23, are arranged to contribute to the flow in separate sequence or cascade arrangement. The controls are set as in the previous description, except that sequence control knob 44 is set to apply a small negative bias to flow controller 35. The sequence control knob 43 is employed to further increase the negative bias on flow controller 34. Thus turbine 3 will furnish the first or preferred portion of the low pressure steam flow, followed by turbine 2, followed by the pressure reducing valve as the command signal increases.

FIG. 4 illustrates a paralleling operation similar to FIG. 2, except that turbine 3 is supplying process steam at one-half the rate of turbine 2 during the flow sharing portion, i.e., up to 30% command signal. The lower incremental flow rate of turbine 3 is obtained by adjustment of the incremental flow control 38 so that only a portion of the command voltage is applied to amplifier 36. Thus, a greater command signal is required for the same flow from turbine 3 than previously. The individual characteristics of turbines 2 and 3 are now shown in dotted lines in FIG. 4. As the command signal increases, the total characteristic shown by the solid line represents sharing of the flow by turbines 2 and 3 at unequal rates, until the flow limit of turbine 2 is reached. Thereafter the flow requirement is met by turbine 3 until its limit is reached, followed by the pressure reducing valve as before.

FIG. 5 illustrates operation with unequal sharing by turbines 2 and 3 as described in FIG. 4, except that a more linear flow characteristic with respect to command signal is obtained using the base flow control 40. A positive bias voltage is applied so that flow will be supplied by turbine 3 even in the absence of a command signal. In this manner, turbine 3 will be furnishing roughly one-half of its capability in the absence of a command signal. As the command signal increases, the turbines 2 and 3 will share the additional requirement, but at unequal rates of contribution to the total.

Many other variations of flow sharing, sequencing and proportionate sharing can be accomplished with the foregoing invention. The applications shown are only illustrative of the many variations. The explanation has been simplified by omitting reference to the effects of the regulation amplifier 31 on the overall system caused by the response of command signal to variations in steam pressure. Details of its operation may be had by reference to the aforesaid Wagner patent application Ser. No. 388,887. The command signal shown on FIGS. 2–5, which is the output of regulation amplifier 31, may be obtained in a number of ways, using any suitable system. The regulation amplifier referred to is useful since it provides any desired response for flow command signal with respect to pressure error input. This can vary from full reset action (no pressure deviation) to simple proportional action (droop in pressure level).

Thus the invention provides the concept of dispatching to vary the proportion and sequence of extraction steam or noncondensing exhaust steam between several turbines in a power system. The process steam is controlled either by passing it through turbine stages and extracting or exhausting it at the desired pressure level or by throttling the steam to the desired pressure. The disclosed system allows flexibility in choosing the most efficient or most desired overall arrangement. Only one typical powerplant has been shown, but it will be apparent to those skilled in the art that the inventive concept could be applied to almost any combination of condensing or non-condensing, extraction or nonextraction turbines combined with pressure reducing stations to obtain the desired system characteristics.

What we claim as new and desire to secure by Letters Patent of the United States is:

1. A pressure regulating system for a steam turbine powerplant supplying process steam comprising:
   a process steam conduit,
   a turbine having a valve and a discharge conduit connected to supply a first flow of steam to said process conduit in response to the turbine valve position,
   a second higher pressure steam conduit,
   a pressure reducing valve connected directly between the first and second conduit,
   first and second valve positioning means arranged to position the turbine valve and pressure reducing valve respectively in response to electrical valve positioning signals,
   third means responsive to steam pressure in said process conduit and arranged to provide a command signal representing a desired pressure/flow relationship in said process conduit, and
   first and second flow controller means connected to receive said command signal from the third means and connected to furnish valve positioning signals to the first and second valve positioning means respectively, together with adjustable biasing means to selectively vary the effects of said command signal on one of the flow controller means, so as to satisfy flow requirements in sequence from the turbine and pressure reducing valve.

2. The combination according to claim 1, wherein said biasing means partially cancels the effects of the command signal on the second flow controller, whereby the flow contribution from the pressure reducing valve is delayed.

3. The combination according to claim 1, wherein said biasing means partially adds to the effects of the command signal on the first flow controller, whereby a base load flow from the turbine is established even in the absence of a command signal.

4. The combination according to claim 1, wherein said second flow controller includes adjustable signal attenuating means to reduce the incremental effect of the command signal on said second flow controller.

5. A pressure regulating system for a steam turbine powerplant supplying process steam comprising:
   a first process team conduit,
   first and second turbines connected to supply steam to the process conduit in response to turbine valve position,
   a second higher pressure steam conduit,
   a pressure reducing valve connected directly between the first and second conduit,
   first, second and third valve positioning means arranged to position the first and second turbine valves and pressure reducing valves respectively in response to electrical valve positioning signals,
   third means responsive to steam pressure in said process conduit and arranged to provide a command signal representing a desired pressure/flow relationship in said process conduit, and
   first, second and third flow controllers responsive to said command signal and arranged to individually control the first, second and third valve positioning means at selected flow levels.

6. The combination according to claim 5, wherein at least one of said flow controllers includes signal attenuating means to selectively proportion the command signal to the individual controller.

7. The combination according to claim 5, wherein at least one of said flow controllers includes signal biasing means to selectively assist the command signal to the individual controller.

8. The combination according to claim 5, wherein at least one of said flow controllers includes signal biasing means to selectively cancel the command signal to the individual controller.

References Cited

UNITED STATES PATENTS 3,233,412   2/1966   Wagner _____ 60—67

FOREIGN PATENTS 499,465   1/1939   Great Britain.

MARTIN P. SCHWADRON, *Primary Examiner.*

CARROLL B. DORITY, *Assistant Examiner.*